United States Patent [19]

Benestad et al.

[11] Patent Number: 4,635,237
[45] Date of Patent: Jan. 6, 1987

[54] DATA TRANSMISSION SYSTEM FOR SEISMIC STREAMERS

[75] Inventors: Otto Benestad, Jar; Kjell Hatteland, Ryken; Paul Fredriksen, Oslo, all of Norway

[73] Assignee: Geophysical Company, Hovik, Norway

[21] Appl. No.: 555,546

[22] Filed: Nov. 28, 1983

[30] Foreign Application Priority Data

Apr. 5, 1983 [NO] Norway .................................. 831203

[51] Int. Cl.[4] ........................... G01V 1/22; G01V 1/38
[52] U.S. Cl. ......................................... 367/20; 367/78; 367/79; 370/16
[58] Field of Search ............................. 367/76, 78–80, 367/20; 370/16, 29, 53, 58; 340/870.11, 870.13

[56] References Cited

U.S. PATENT DOCUMENTS

| 4,117,448 | 9/1978 | Siems | 367/79 |
| 4,398,271 | 8/1983 | Cretin et al. | 367/20 |
| 4,398,285 | 8/1983 | Lutz et al. | 370/16 |
| 4,463,350 | 7/1984 | Kajiura et al. | 370/16 |

FOREIGN PATENT DOCUMENTS 2446391  4/1976  Fed. Rep. of Germany ........ 370/16

OTHER PUBLICATIONS

Gus-Bus Digital Seismic Telemetry System Publication, Gus Manufacturing, Inc., 9/77.

Primary Examiner—Thomas H. Tarcza
Assistant Examiner—Ian J. Lobo
Attorney, Agent, or Firm—Holman & Stern, Chartered

[57] ABSTRACT

Transmitting information from a central receiver and recorder utilizes plural series-connected transmission modules, each connected to a respective data acquisition unit. The transmission modules are sequentially connected along plural transmission lines, at least two of which are outgoing data transmission lines for transmitting information from the central receiver and recorder to the acquisition units. At least two other lines are incoming data transmission units to the central receiver and recorder. Each transmission module has, for each outgoing line, respective line receivers, information decoders, line transmitters and matrices of transmission line selectors controlled by individual information decoders, and a selector unit which ensures that a signal from a selected outgoing transmission line is transmitted to the next module on all outgoing transmission lines. At least one of the incoming data transmission lines is a spare line, the other being connected to a coupling matrix which inlcudes an input selector, a data selector, and an output selector for each ordinary line, and one output selector for the spare line. Each input selector chooses whether the transmitted signal travels via the spare line or the associated ordinary line. The data selector chooses whether the resulting signal is transmitted further or data from its own data acquisition unit enters the data stream. The output selector chooses whether the new resulting signal is transmitted further only on its ordinary line or is also transmitted further on a spare line. Each set of input selectors, data selectors and output selectors belonging to the spare line are controlled from the information decoder belonging to the selected outgoing transmission via individual multiplexers.

7 Claims, 3 Drawing Figures

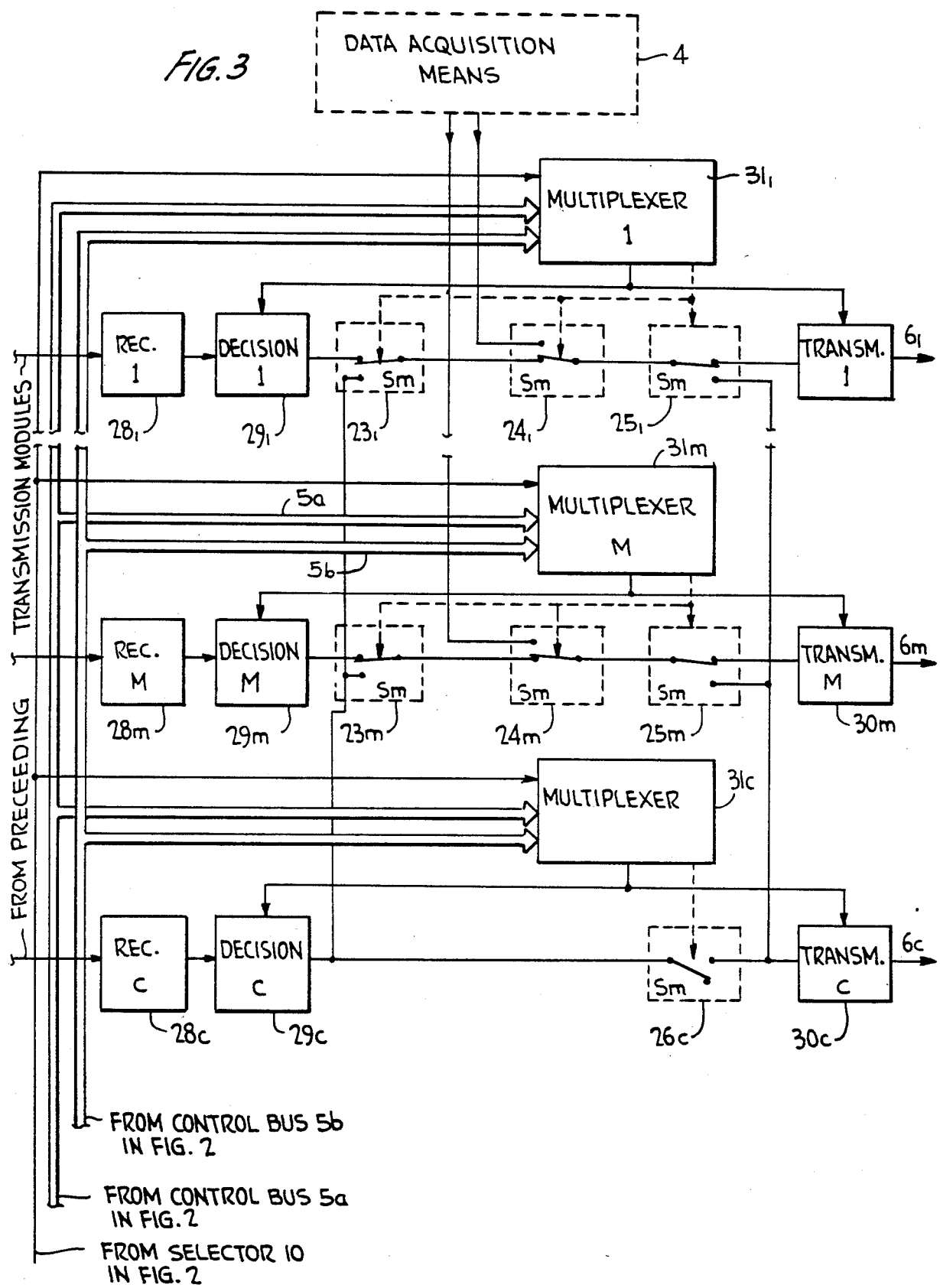

DATA TRANSMISSION SYSTEM FOR SEISMIC STREAMERS

BACKGROUND OF THE INVENTION

The present invention relates to systems for transmitting information from a plurality of seismic data acquisition means to a central receiver and recording means, comprising a plurality of transmission modules each connected to the data acquisition means.

Seismic data acquisition means are usually made up of a group of hydrophones (or geophones) which provide data in the form of analog signals. If each seismic data acquisition means has M channels and N such data acquisition means are used in one array, M · N data channels are required for data transmission. The transmission distance is typically from 3 to 5 km.

For practical reasons, seismic cables are made in sections of 50 to 100 meters in length with electrical connectors at each end to permit the cables to be connected in series to obtain the desired length and number of channels. The conventional method is to utilize twisted pairs for analog transmission of the seismic data, using one pair for each channel. The data are digitized in the central receiver and recording means and stored on magnetic tape for subsequent processing in the computer.

A major weakness of such conventional methods is that due to the very large number of electrical contacts in the connectors, the probability of faults is high. A further drawback is that due to the large number of electrical conductors, the cable becomes large, heavy and difficult to handle. This, in practice, imposes an upper limit on the number of transmission channels possible, a limit of 240 channels being the maximum. The conventional method of transmitting data in the form of analog signals also results in a reduction in the quality of the data during transmission to the central receiver and recording means.

It has been recognized in the prior art that the above drawbacks mentioned can be reduced significantly by digitizing the seismic data in units located in the immediate vicinity of the acquisition means and transmitting the digital data on a digital transmission system to the central receiver and recording means. However, a new and important drawback arises with such a system, in that complicated electronics components must be distributed throughout the system. This is especially a problem in connection with marine seismic data acquisition since several hours of expensive ship time are required to wind the cable in and out if a defective module has to be replaced. Although several different brands of digital transmission systems for marine seismic data acquisition, so-called digital streamers are commercially available. All of these systems have the weakness that they are not constructed to function satisfactorily if faults occur either in the transmission lines or in the electronics part of the system.

The requirements which must be met by digital transmission systems for seismic streamers differ in certain fundamental areas from other known data transmission systems. A characteristic feature of general digital transmission in a seismic streamer is the exceedingly critical balance that must be struck between the requirements of reliability and complexity, power consumption, weight and volume. All of the electronics must be placed inside water-tight housings between the sections of seismic cable. These housings must be as short as possible to allow the cable to be wound up on a winch, and they must also be slim in order to avoid any turbulence which would generate acoustic noise when the housings are towed through the water. The power consumption of a digital seismic streamer can easily be 1 kW or more. Over the transmission distances in question, and with the voltages that are permitted to be used, the conductor cross section becomes large, resulting in a heavy and cumbersome cable. The weight of both the cable and the electronics housing is a very important factor, since the cable of necessity must have the same specific gravity as the water, or, in other words, be neutrally buoyant.

In view of the above-mentioned drawbacks associated with digital data transmission systems, it would be desirable to have complete redundancy by providing duplicate sets of the electronics units. However, for the reasons mentioned above, it has not been possible to provide duplicate sets of electronics seismic streamers. With the present invention, however, a total solution is provided which, in a simple manner, provide essentially the same advantages as a complete double set of electronics, with complete switching capability in each module to the backup of electronics and to the spare line. At the same time the system has a modular construction which makes it particularly well suited for implementation with customer-specified integrated circuits, thereby providing important advantages with respect to weight and volume.

SUMMARY OF THE INVENTION

In accordance with the present invention there is provided a system of the type defined above which is characterized by the features recited in the appurtenant patent claims.

In the system of the present invention, an arbitrary fault in one section (comprising a 50 to 100 meter section of cable, a seismic data acquisition means with M channels, and associated digitizing and transmission equipment) in the worst case results in a loss of the date from one of the M channels, with no ensuing consequences for the data from the preceding or trailing section. An "arbitrary fault" as used in this context means either a break or short circuit in one of the cable pairs in the section or a malfunction in an electronic component in the section. The present invention provides a system for transmitting information from a plurality of seismic data acquisition means utilizing a plurality of transmission lines, at least two of which take the form of outgoing data transmission lines and transmit information from the central receiver and recording means to the data acquisition means. At least two other lines take the form of incoming data transmission lines and transmit information from the data acquisition means to the central receiver and recording means. The transmission module for each of the outgoing transmission lines comprises separate line receivers, information decoders and line transmitters, as well as matrices of transmission line selectors controlled by individual information decoders, and a selector unit which ensures that a signal from the selected outgoing transmission line is transmitted further selected outgoing transmission module and all the outgoing transmission lines. At least one of the incoming data transmission lines is a spare line on all the other incoming transmission lines are so-called ordinary lines which are connected through a coupling matrix consisting of an input selector, a data selector and an output selector for each ordinary line and one output selector for the spare line. The coupling matrix operates in such manner that each individual input selector chooses whether the signal that is to be connected further and the ordinary line shall be taken from the spare line or from the associated ordinary line. The data selector chooses whether the resulting signal shall be transmitted further or we whether data from its own data acquisition means shall be entered in the data stream. The output selector chooses whether the new resulting signal shall be transmitted further only on its own ordinary line or whether it shall also be transmitted further on the spare line. Each set of input selectors, data selectors and output selectors belonging to the spare line obtain their associated control signals from the information decoder belonging to the selected outward transmission line via individual multiplexers.

BRIEF DESCRIPTION OF THE DRAWINGS

The invention will be described in greater detail in the following with reference to the accompanying drawings, wherein FIG. 3 is a block diagram of the incoming data transmission lines for a transmission module N.

DESCRIPTION OF THE PREFERRED EMBODIMENTS

Figure 1:
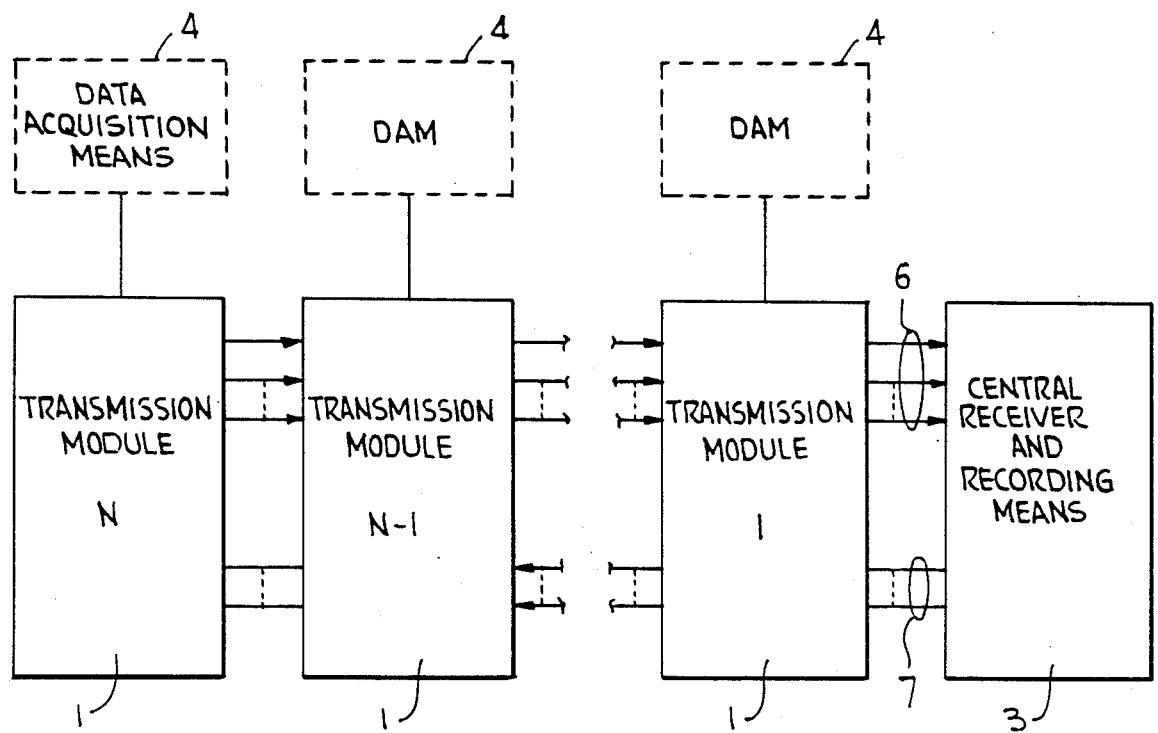
FIG. 1 is a schematic block diagram of the system.

Referring specifically to FIG. 1, there is illustrated a plurality N of transmission modules 1 which transmit data from seismic data acquisition units 4, via a plurality of incoming data transmission lines 6, to a central receiver and recorder 3. A plurality of outward data transmission lines 7 from the central receiver and recorder means 3 extend to the transmission modules 1 to transmit clock signals and commands which control the entire data acquisition and transmission processes during normal operation and when a fault occurs.

Figure 2:
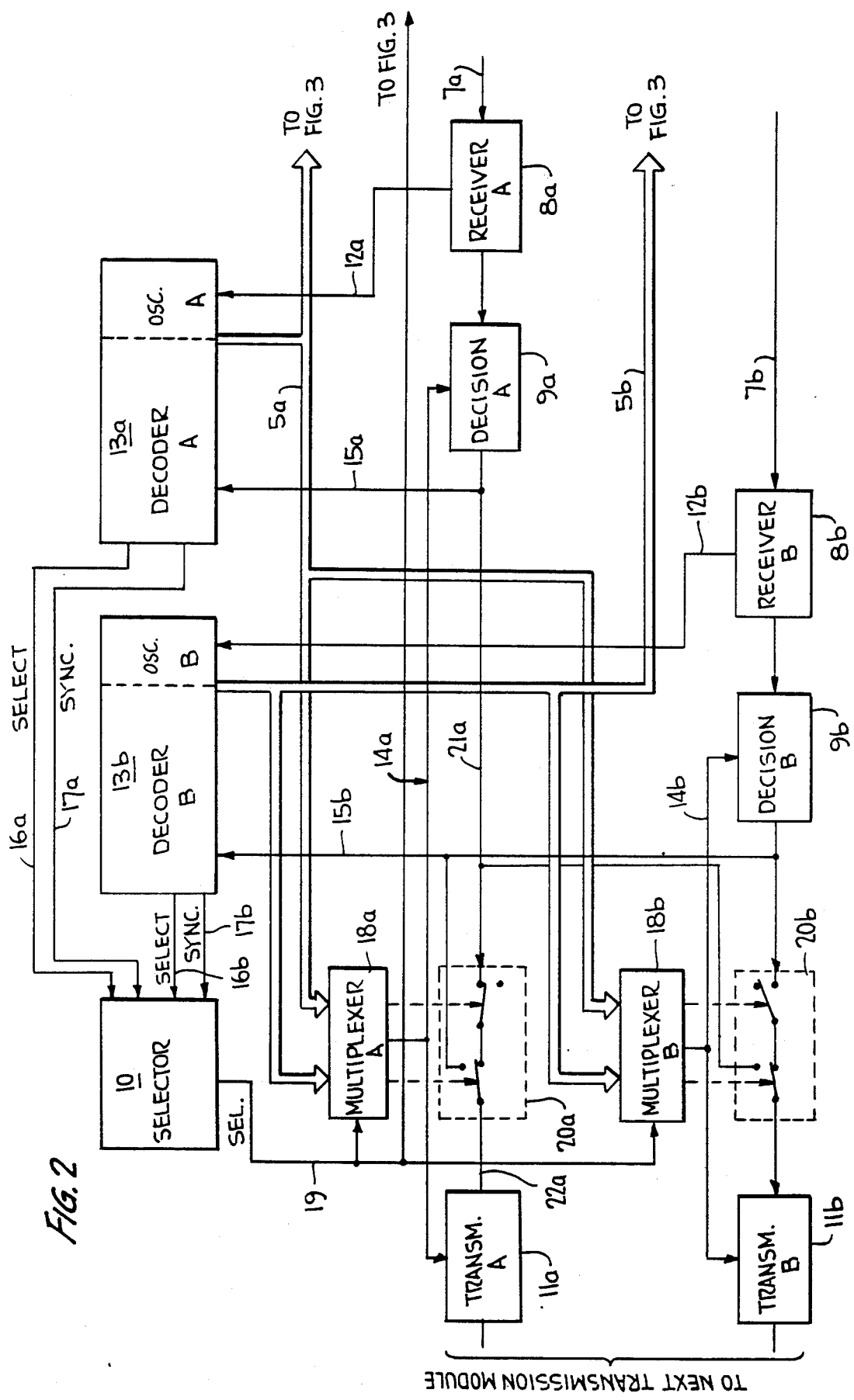
FIG. 2 is a block diagram of the outgoing data transmission lines for a transmission module N.

Part of the transmission module 1 relating to the outward data transmission lines 7a and 7b is illustrated in FIG. 2. Since each transmission module 1 is entirely dependent upon obtaining correct control data from the central receiver and recorder means 3, two outward data transmission lines 7a and 7b are used, and data from at least one of these must be correct. The signal path through the unit follows this sequence: receivers A 8a and B 8b, decision units A 9a and B 9b, selector matrices 20a and 20b and transmitters A 11a and B 11b. In the receivers A 8a and B 8b, the signal is amplified and decoded from AMI code (Alternating Mark Inversion) to NRZ code (Non Return to Zero). At the same time a signal is branched via lines 12a and 12b to the clock (A and B) in the information decoders A 13a and B 13b, which are used for regeneration of the clock signal routed via lines 14a and 14b, and the resulting signal is branched via lines 15a and 15b to the decoders A and B in the information decoder units A 13a and B 13b. These decoder units generate respective control buses 5a and 5b which control all the functions in the transmission module. The next unit in the signal paths are the selector matrices 20a and 20b, whihh are connected to the decision units A 9a and B 9b via respective lines 21a, 21b at one side, and at the other side to transmitter A 11a and transmitter B 11b via respective lines 22a, 22b.

In transmitters A 11a and B 11b the signal is converted from NRZ to AMI code and amplified.

The information decoders A 13a and B 13b are connected to the selector unit 10 via respective line pairs 16a, 17a and 16b, 17b. A "select" signal is routed over lines 16a and 16b, and a "sync" signal over lines 17a and 17b.

As may be seen in FIG. 2, the electronics employed for the outward transmission lines 7a and 7b is an almost completely duplicate or redundant system. This ensures 100% fault tolerance and, in addition, it renders possible the rise of modular construction. In regard to the latter, it should be noted that the units consisting of the receivers A 8a and B 8b, the decision units A 9a and B 9b, the selector matrices 20a and 20b, the transmitters A 11a and B 11b, and multiplexers A 18a and B 18b are identical for the two outward data transmission lines 7a, 7b and are also identical to the corresponding units for the inward data transmission lines 6 ($6_1$–$6_m$, 6c in FIG. 3). With regard to fault tolerance; a brief explanation of what occurs when various faults occur is provided below.

The normal state is that in which the selector unit 10 sends a select signal "Sel" equivalent to binary "0" via line 19 to the multiplexers A 18a and B 18b, whereby outward transmission line 7a is designated as the selected line from which all information is accepted. Multiplexer A 18a and multiplexer B 18b ensure that only signals from control 5a are utilized while signals from control bus 5b are ignored. Selector matrices 20a, 20b are thus also placed in the position that signals received from outward transmission line 7a are transmitted further on both channels to the A and B units. If a break occurs in transmission line 7a so that the receiver A 8a receives no signal, information decoder A 13a drops out of synchronization and issues a warning, whereby the "Sync" signal on line 17a changes from binary "1" to binary "0". At the same time the clock information on the control bus 5a disappears, causing the decision unit 9b to lose its clock signal, whereby the information decoder B 13b drops out of synchronization and issues a warning with its "Sync" signal. Selector unit 10 is thus in receipt of indications that both information decoders A 13a and B 13b are out of sync and responds by triggering the system to select transmission line 7b by causing the signal "sel" on line 19 to go from binary "0" to binary "1" for a period of at least 500 milliseconds. The control and clock signals are thus drawn from control bus 5b, the decision unit B 9b again obtains a clock signal, and the information decoder B 13b becomes synchronized with information decoder A 13a remaining out of sync. The Selector matrices 20a, 20b switch over so that the signals from the transmission line 7b travel further on the lines to both the A and B units and correct data transmission is re-established on both lines.

If an electronics fault occurs in the receiver unit A 8a or in the clock signal regenerator A in the information decoder A 13a, the same procedures take place as in the case of a break in the transmission line 7a.

In the case of an electronics fault in either the decision unit A 9a or the decoder A in the information decoder A 13a, erroneous control signals are sent out on the control bus 5a. This affects the entire mode of operation of the transmission module, and an indication is immediately registered in the central receiver and recorder 3 (FIG. 1) that data from the transmission module in question is erroneous (parity check). The central receiver and recorder means 3 then sends a command to the transmission module 1 to shift from transmission line 7a to 7b. This command is decoded in decoder B in information decoder B 13b, which generates a "Select" signal on line 16b to selector unit 10, the "Sel" signal changing from binary "0" to binary "1"; status is thereby restored.

A fault in the selector unit 10 has no serious consequences as long as the other units are operating properly (it being assumed a priori that faults do not occur simultaneously in several of the units in one transmission module).

A fault in multiplexer A 18a, selector matrix 20a or transmitter A 11a affects only outward transmission line 7a, whereas data on outward transmission line 7b remains correct.

A fault in receiver B 8b, transmission line 7b, information decoder B 13b, decision unit B 9b, multiplexer B 18b, selector matrix 20b or transmitter B 11b has no particular consequence, except that the fault is registered in a separate monitoring unit in the transmission module (not shown in FIG. 2), and information about the status of the transmission module is transmitted regularly to the central receiver and recording means 3 (FIG. 1).

At all connections where several units are suspended on the same line, a soft coupling (resistance coupling) is utilized in order that a defective unit does not destroy the signal for the other units connected to the line. In selector unit 10, transition detection is used for the "Select" signal, so that a "Select" signal which is consistently high or low by reason of a fault is ignored.

FIG. 3 illustrates the part of the transmission module 1 of FIG. 1 which relates to the transmission of data on inward data transmission lines 6. The system is constructed such that there are as many ordinary inward data transmission lines $6_1$–$6_m$ as there are channels in a seismic data acquisition means. In other words, one ordinary transmission line is provided for each channel, but corresponding channels in other transmission modules are also multiplexed onto the same transmission line. This in itself is a main principle of the system and ensures a simple, modular construction. This principle is completely new in the field of data transmission with digital seismic streamers.

In addition to the M ordinary lines $6_1$–$6_m$, there is a spare line 6c. By means of input selectors $23_1$–$23_m$ in a selector matrix (generally designated Sm and consisting of the input selectors $23_1$–$23_m$, the data selectors $24_1$–$24_m$, the output selectors $25_1$–$25_m$ for the ordinary lines $6_1$–$6_m$ and the output selector 26c for the spare line 6c) the signal from the spare line 6c can be fed in on an arbitrarily chosen ordinary line $6_1$–$6_m$. Similarly, a signal identical to the signal on an arbitrarily chosen ordinary line $6_1$–$6_m$ can be transmitted on the spare line 6c by means of one of the output selectors $25_1$–$25_m$. A data selector $24_1$–$24_m$ ensures that data from its own seismic data acquisition means is interpolated in the correct place in the sequence together with data from the transmission modules downstream of this module.

In addition to the M ordinary lines $6_1$–$6_m$ and the spare line 6c, an auxiliary line is also utilized (not illustrated in FIG. 3). This is identical to the ordinary lines $6_1$–$6_m$, but instead of obtaining its data from the seismic data acquisition means it obtains data from an auxiliary unit. The user can determine which data he wishes to enter here, for example, pressure, temperature, humidity, compass course, etc. With a certain regularity, this channel is also used for transmitting the status of the transmission module (as mentioned previously).

All control signals necessary for controlling the transmission on the inward data transmission lines $6_1$–$6_m$, both under normal conditions and in fault situations, are taken from the control bus 5a, 5b and the line 19 from the selector unit 10 in FIG. 2. The same control signals and the same control principles utilized for the outward data transmission lines are utilized for the inward transmission lines. The multiplex function is decentralized, so that a fault in the multiplexer knocks out a maximum of one channel.

The fault situations that can occur are as follows: In case of a break or short-circuit in one of the ordinary lines $6_1$–$6_m$, the data stream on this line from all transmission modules downstream of the fault is destroyed. This is immediately detected by the central receiver and recorder 3 (FIG. 1; parity check), which issues a command to the transmission modules 1 in front and in back of the fault location to re-route data from the ordinary line in question to a spare line and back on-line again. Full restoration is obtained and no data is lost after the switching is undertaken.

If an electronics fault occurs in the sub-module consisting of the following units: receivers $28_1$–$28_m$, decision units $29_1$–$29_m$, selector matrix. Sm, transmitters $30_1$–$30_m$ and multiplexers $31_1$–$31_m$, the fault it similarly detected in the central receiver and recorder 3, which issues a command to the transmission modules 1 upstream of the fault location to re-route the ordinary line in question, $6_1$–$6_m$, to the spare line 6c by means of the selector $25_1$–25m. A command is sent to the transmission module 1 with the fault, instructing that the signal on the spare line 6c is to be connected to the selector 26c in the next transmission module 1, and in the subject transmission module the signal is again re-connected to the correct ordinary line $6_1$–$6_m$ by means of the selector $23_1$–$23_m$. The result of the switching is that only one channel in the section is lost, a situation which is considered acceptable.

In marine seismic data acquisition, as mentioned previously, quite special demands are made of the data transmission system in the seismic streamer. With prior art digital streamers there have been problems in obtaining the necessary reliability, which is assumed to be the reason why conventional analog streamers still dominate the market. The present invention: makes possible a modular construction of the electronics with identical, customer-specified electronic circuits; thus greatly reduces the number of active electronic components; provides a system with selector matrices and partial duplication of the electronics as well as soft coupling between the duplicated units to ensure 100% fault tolerance; and therefore represents a substantial improvement in relation to the prior art systems.

Having described several embodiments of a new and improved data transmission system for seismic streamers constructed in accordance with the present invention, it is believed that other modifications come in variations and changes will be suggested to those skilled in the art in light of the above teachings. It is therefore to be understood that all such variations come in modifications and changes are believed to fall in the part of the invention as found in the appended claims.

We claim:

1. A system for transmitting information between a plurality of seismic data acquisition means and a central receiver and recording means comprising:

a plurality of transmission modules which each are adapted to a respective data acquisition means and which are interconnected through a plurality of transmission lines of which at least two lines constitute outgoing data transmission lines and transmit information from the central receiver and recording means to the data acquisition means, and at least a second two lines constitute the incoming transmission lines for transmitting information from the data acquisition means to the central receiver and recording means, the transmission modules for each of the outgoing transmission lines comprising separate line receiver means and line transmitter means for each of the outgoing data transmission lines;

each of the transmission modules also comprising separate information decoder means which independently of each other generate a separate set of commands from each of the associated outgoing transmission lines;

a selector means pointing out which of the outgoing transmission lines at any time is to be used and accordingly also which of these sets of commands are to be regarded as valid;

and a matrix of transmission line switching means comprising separate switches organized in rows and columns so that the number of rows is equal to the number of outgoing transmission lines, and each row in the matrix is constituted by two selectors which both are arranged in the signal path of its associated outgoing transmission line, a first selector being able to break the signal path in the line in question and a second selector performing cross connection of the signals from one line to the other line(s), said matrix of transmission line switching means being controlled by commands from the information decoders via control signal multiplexer units which select a valid command set according to the control signal from selector means, in such a way that the signals from the selected one of the outgoing transmission line are transmitted further to the next transmission module on all the outgoing transmission lines.

2. A system as claimed in claim 1, wherein the transmission line switching means for each row of the matrix receive their control signals from its own separate independent control signal multiplexer unit in such a manner that a fault in one control signal multiplexer or one row of the transmission line switching means in worst case can destroy the signals of one of the outgoing transmission lines to the next transmission module.

3. A system as claimed in claim 1, wherein the said selector means is controlled by two signals from each of the information decoder means, namely a select-signal which is generated in the information decoders by command from the central receiver and recording means, and a sync signal which is generated in the information decoders when the flow of commands received is in correspondence with a fixed protocol in such a manner that the selector means select another of the outgoing transmission lines if at least one of the information decoders through its select-signal reports thereabout, or if all information decoders through its sync-signal reports about receiving faulty information.

4. The system according to claim 3, wherein said select signal lines are connected to the selector means through derivator components, so that the selector means is uninfluenced by a select signal which is constantly kept on a high or low level due to a fault in the corresponding information decoder;

the select signal from the selector means being connected to control signal multiplexer units for each respective switching means via individual resistor means, so that a fault in one of the multiplexer units do not influence the select signal to the other control signal multiplexer units;

the control signals from the information decoders being connected to the control signal multiplexers via individual resistors to avoid a condition wherein fault in one of the multiplexer units will influence said control signal to the other control signal multiplexer units.

5. A system according to claim 1, wherein there are at least as many inward data transmission lines as channels in the seismic data acquisition means; these channels transferring their data on each associated inward transmission line in time multiplex with channels from the other seismic data acquisition means by means of transmission modules for the inward transmission lines comprising separate and independent transmission line selectors for each transmission line, said selectors providing a switching matrix which controls the multiplexing of each of the inward transmission lines and which make it possible to cross-connect signals on one or more spare lines.

6. A system according to claim 5, wherein said switching matrix for the inward transmission lines comprises:

input selector means connected to each ordinary inward data transmission line for selecting whether a signal which is to be transmitted along said inward data transmission path is to be taken from the ordinary or the spare inward transmission line;

data selector means connected to each ordinary inward data transmission line for performing a time division multiplexing of own data from the data acquisition means with the inward data stream;

output selector means connected to each inward data transmission line, and spare line output selector means connected to said spare inward data transmission line, for selecting which data, if any, that are to be transmitted to the next transmission odule on the spare inward transmission line.

7. A system according to claim 6; wherein the coupling matrix means are controlled by individual multiplexer units, which receives select signals from a selector unit via individual resistors as well as control signals from information decoders via further individual resistors.

* * * * *